Patented Dec. 31, 1935

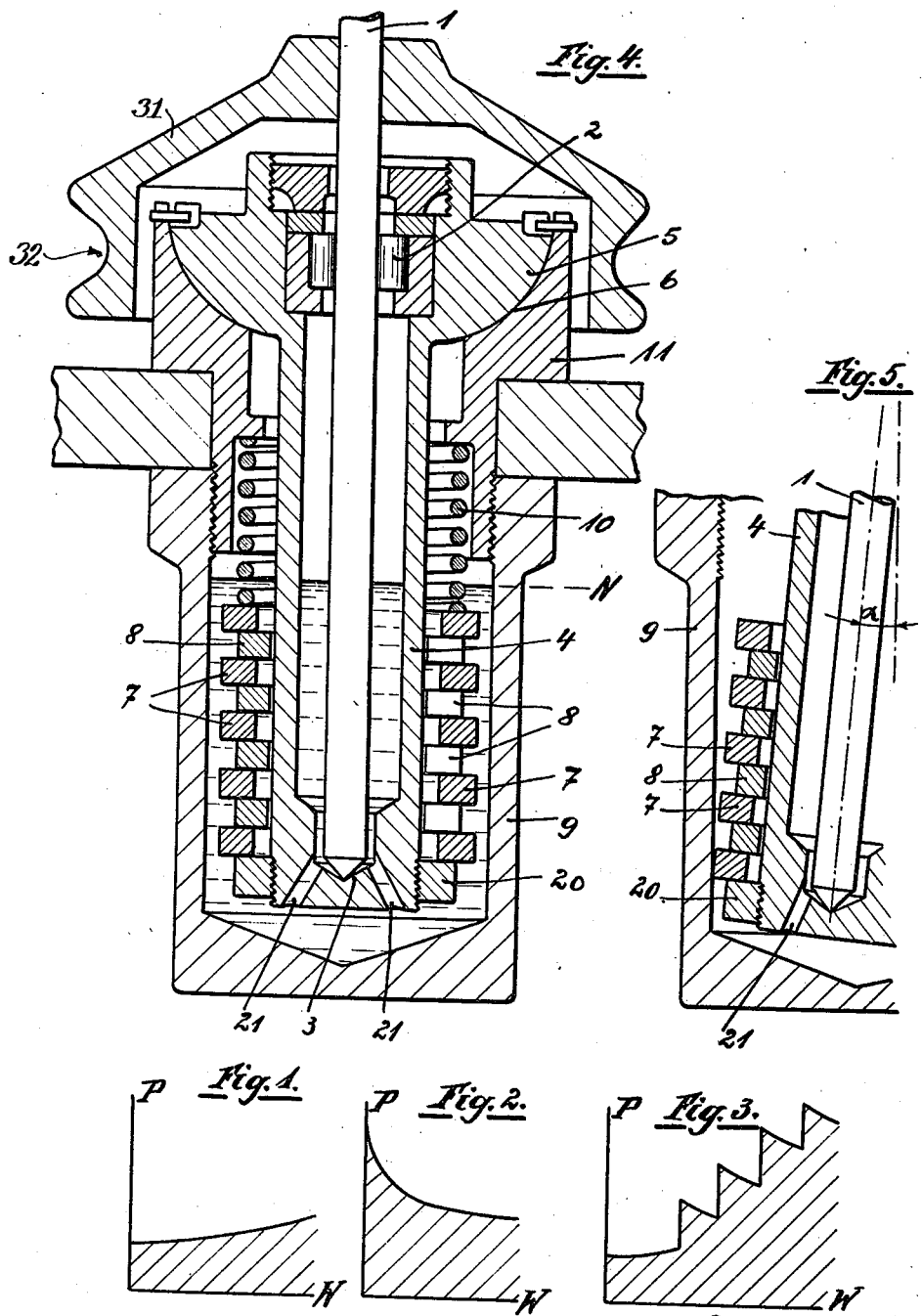

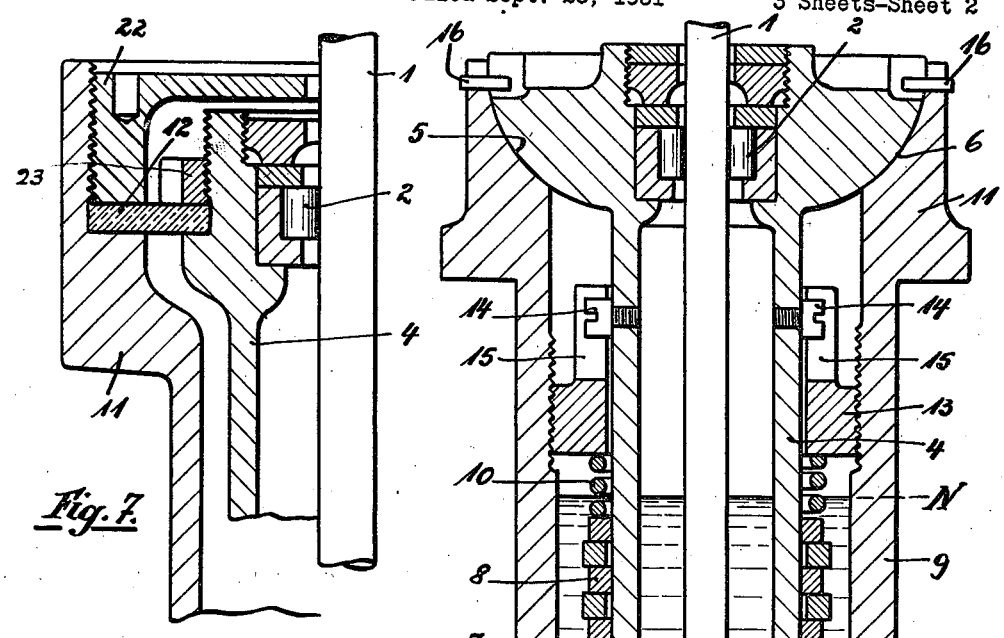
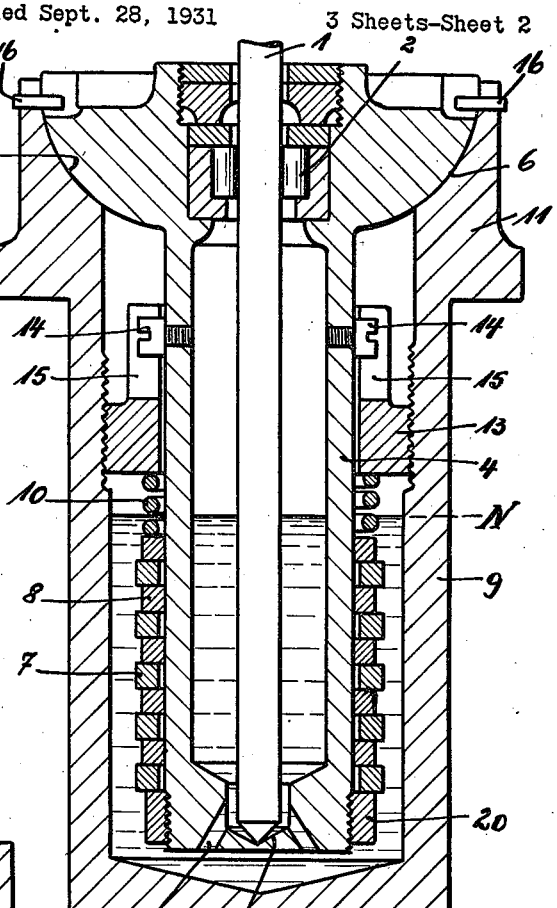
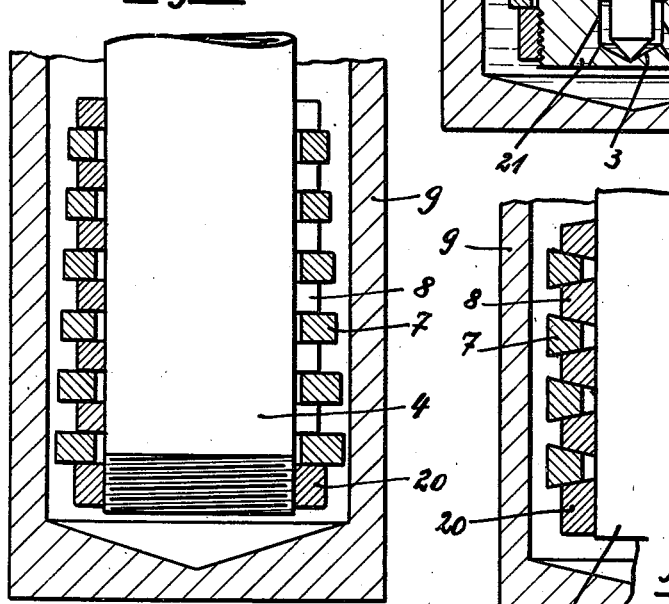

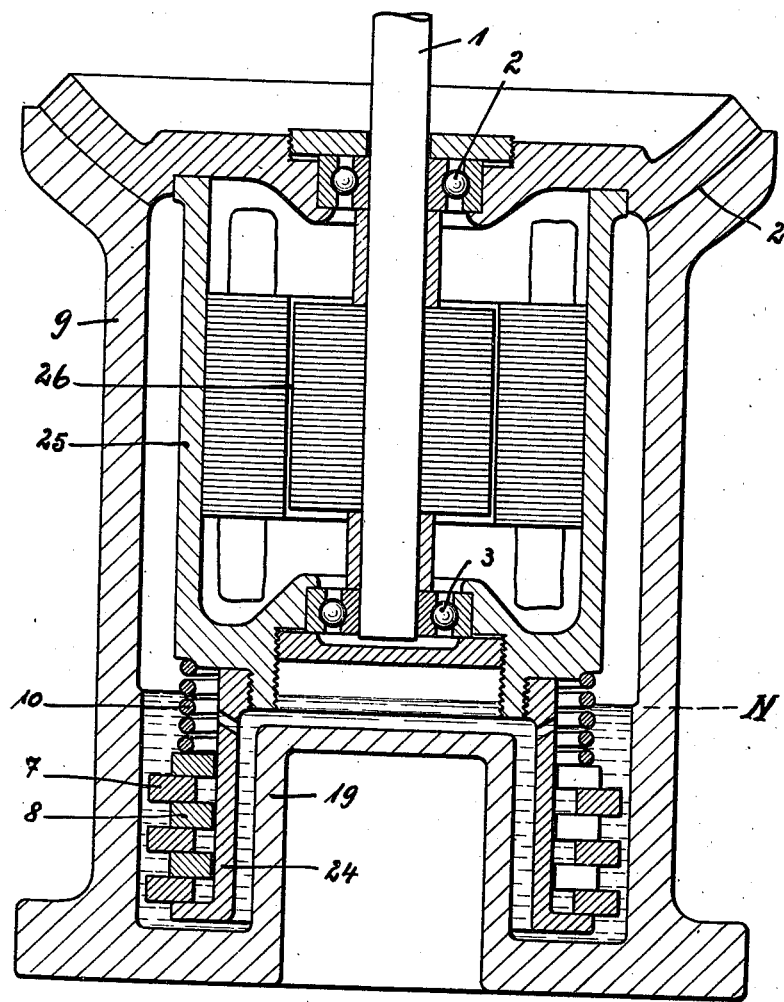

2,025,787

UNITED STATES PATENT OFFICE 2,025,787

SPINDLE BEARING

Wilhelm Stahlecker, Canstatt, near Stuttgart, and Julius Raible, Stuttgart, Germany, assignors to Vereinigte Kugellagerfabriken A.-G., Berlin, Germany Application September 28, 1931, Serial No. 565,684
In Germany March 23, 1931

10 Claims. (Cl. 308—145)

Our invention relates to spindle bearings and more especially to bearings mounted for rocking motion.

It is an object of our invention to provide means, in connection with such bearings, whereby the oscillations of the spindle arising at high numbers of revolution are damped or braked in a particularly simple and efficient manner. To this end we combine fluid and friction damping means in such manner that the friction means becomes operative only after the oscillations of the spindle have overstepped a predetermined limit.

Fluid damping usually is not effective enough, particularly if the amplitude of the vibrations is great because under normal conditions the available space is too small. Friction damping presents the drawback of jerky action because the static friction must be overcome initially, and is particularly bad if the friction faces are not amply lubricated.

According to our invention these drawbacks are eliminated by combining fluid and friction damping means in such manner that the oscillations are initially damped by the fluid, and later by friction, the action of the friction means being preferably increased step by step.

In the drawings affixed to this specification and forming part thereof apparatus embodying our invention are illustrated diagrammatically by way of example.

In the drawings:

Fig. 1 is a diagram illustrating the action of fluid damping,

Fig. 2 is a diagram illustrating the action of friction damping, and

Fig. 3 is a diagram illustrating the action of our combined fluid and friction damping;

Fig. 4 is an axial section of a combined fluid and friction damping apparatus for a vertical spindle, Fig. 5 shows the position of its parts when friction damping begins, Fig. 6 shows an apparatus having means for regulating the tension of the spring by which the friction members are loaded, Fig. 7 shows an apparatus with a diaphragm inserted between the bearing of the shaft and the bearing block, Fig. 8 shows friction rings of different outside diameters, Fig. 9 shows tapered friction rings, and Fig. 10 shows our apparatus as applied to the bearing of a motor-driven centrifuge.

Referring now to the drawings, and first to Figs. 1 to 3, the damping action P is plotted against the amplitude W of the oscillation. It will appear from Fig. 1 that in fluid damping the increase of P with W is only small, and from Fig. 2 that the initially present static friction is comparatively high. As W increases, P decreases rapidly at first, and then more gradually.

Fig. 3 shows the action of our combined damping with fluid damping at the beginning, and thereupon friction damping with stepwise increased action. Sufficiently effective increase of P may be obtained under all conditions. Initially, the fluid damping starts softly, its action increasing gradually. Later, the first stage of friction becomes active, abruptly but without increasing P to an undesirable extent, so that there is no appreciable jerking. When static friction changes into dynamic friction, P decreases in proportion until it is increased again at the next step, and so on.

Referring now to Figs. 4 and 5, an action P as shown in Fig. 3 may be obtained with an apparatus of this type. 1 is a shaft or spindle which rotates in a radial roller bearing 2 and a step bearing 3 with fluid passages 21 in a bearing sleeve 4 which at the level of radial bearing 2 is supported in a spherical seat 6 of the bearing block 11 by a spherical boss 5. 9 is a casing which is screwed to the lower tubular end of the block 11.

31 is a member for rotating the spindle, here shown as a pulley or sheave for a rope. The groove or tread 32 of the pulley or sheave is at the level of the radial bearing 2 so that the force exerted by the rope or belt (not shown) which is placed on the pulley, acts directly on the radial bearing and does not exert a torque on the spindle. Obviously, such a torque would be exerted if the tread of the pulley were not at the level of the radial bearing 2.

7 and 8 are flat annular friction discs or rings arranged at a suitable distance from the centre of oscillation, the rings 7 having a larger diameter than the rings 8. 20 is a threaded support for the rings at the lower end of sleeve 4. The smaller rings 8 make a loose fit on the sleeve 4 while the larger rings 7 are spaced amply from the sleeve 4. All rings are spaced apart from the inner wall of casing 9, but obviously the clearance is smaller for the larger rings 7.

The casing 9 is filled with oil or grease to the level N. Preferably the rings 7, 8 are split for facilitating the distribution of the lubricant. Pressure is exerted on them by a spring 10 which bears on the topmost ring 7 with its lower end, and on a flange or shoulder in the bore of block 11 with its upper end. The spring not only holds the rings 7, 8 engaged but also forces the spherical boss 5 down on the seat 6. This is important because the oscillation of the apparatus must occur without appreciable slack so that there will be no yield when the friction rings 7, 8 become active.

If the spindle 1 starts oscillating the sleeve 4 at first encounters the resistance of the fluid in the casing 9 which it circulates. When the oscillation attains the predetermined angle α, Fig. 5, the lowest larger ring 7 engages the casing 9 and, if the angle increases further, even slightly, the ring 7 slides on the support 20 and on the ring 8 above it. This is the first step of frictional damping, Fig. 3. Upon still further increase of the angle, the next ring 7 becomes active, and so on.

It is not necessary that the passages 21 should be provided and that the damping liquid should also be the lubricant for the step bearing 3, but the space in which damping occurs might be closed against the lubricant for the bearing.

Referring to Fig. 6, this apparatus is substantially similar to that just described but means are provided for regulating the pressure of the spring 10. 13 is a spring plate which is screwed into a thread in the casing 9 by rotating the sleeve 4, 14 being pins on the sleeve engaging in slots 15 in the boss of the spring plate 13. 16 are checks at the upper end of the block 11 (which is here integral with the casing 9) for holding the sleeve 4 in position.

Referring to Fig. 7 the slackless connection between the sleeve 4 and the block 11 is here effected by a diaphragm 12 of resilient material such as leather, sheet metal, etc., instead of the spherical bearing 5, 6 which diaphragm is held in the block 11 by a shoulder and a nut 22, and on the sleeve 4 by a shoulder and a nut 23.

Referring to Fig. 8, the outside diameter of the rings 7 and 8 may be reduced from the lowermost to the uppermost ring by which means the stepped operation becomes particularly effective. A similar effect may be achieved by tapering the casing 9, with the larger inside diameter at the top.

Referring to Fig. 9, the rings 7 and 8 have trapezoidal cross-sections which results in an increase of friction in proportion to the increase of the amplitude. Consequently the damping action may be increased by the reduction of the damping action which occurs between two steps in the diagram Fig. 3.

Referring to Fig. 10, the bearing for the centrifuge is similar to that shown in Fig. 4 but the damping apparatus is self-contained, being supported by a sleeve 24 screwed to the casing 25 of an electromotor 26 independently of the manner in which the motor is supported. The motor casing 25 contains the bearings 2 and 3 of the shaft or spindle 1, here shown as ball bearings, the motor casing 25 replacing the sleeve 4. The motor casing has a spherical boss 27 in a seat at the upper end of the casing 9 so that the motor is free to oscillate in the casing 9. In the arrangement illustrated, with the spring 10 inserted between the motor casing 25 and the rings 7, 8 the spring does not react on the spherical bearing 27. However, the spring might be abutted on the casing 9 so as to react on the bearing.

The damping action is increased by providing a cylinder 19 on the base of the casing 9 which projects into the sleeve 24 with a suitable clearance. The lubricant is at the level N. When oscillations occur the fluid will initially become active in the clearance between 24 and 19, and between the rings 7, 8 and the wall of casing 9. Later on the larger rings 7 will successively engage the wall of the casing, as described.

We wish it to be understood that we do not desire to be limited to the exact details of construction shown and described for obvious modifications will occur to a person skilled in the art.

We claim:

1. A spindle mounting comprising a casing, a pivotal member fixed on said casing, a sleeve mounted to oscillate about said pivotal member at one of its ends and projecting into said casing with its other end in spaced relation to the inner wall of said casing, a spindle mounted to rotate in said sleeve, a body of vibration dampening fluid in the annular space between said sleeve and said casing, and frictional damping means mounted on said sleeve in said space for displacement transversely to the axis of said sleeve, said means being adapted to engage the inner wall of said casing in certain relative positions of said sleeve and said casing.

2. A spindle mounting comprising a casing, a pivotal member fixed on said casing, a sleeve mounted to oscillate about said pivotal member at one of its ends and projecting into said casing with its other end in spaced relation to the inner wall of said casing, a spindle mounted to rotate in said sleeve, a body of lubricant in the annular space between said sleeve and said casing constituting fluid dampening means, and frictional damping means mounted on said sleeve in said space for displacement transversely to the axis of said sleeve, said means being adapted to engage the inner wall of said casing in certain relative positions of said sleeve and said casing.

3. A spindle mounting comprising a casing, a pivotal member fixed on said casing, a sleeve mounted to oscillate about said pivotal member at one of its ends and projecting into said casing with its other end in spaced relation to the inner wall of said casing, a spindle mounted to rotate in said sleeve, a body of vibration dampening fluid in the annular space between said sleeve and said casing, and annular friction disks of alternately differing diameters mounted on said sleeve in said space for displacement transversely to the axis of said sleeve, said disks being adapted to engage the inner wall of said casing in certain relative positions of said sleeve and said casing.

4. A spindle mounting comprising a casing, a pivotal member fixed on said casing, a sleeve mounted to oscillate about said pivotal member at one of its ends and projecting into said casing with its other end in spaced relation to the inner wall of said casing, a spindle mounted to rotate in said sleeve, a body of vibration dampening fluid in the annular space between said sleeve and said casing, annular friction disks of alternately differing diameters mounted on said sleeve in said space for displacement transversely to the axis of said sleeve, said disks being adapted to engage the inner wall of said casing in certain relative positions of said sleeve and said casing, and means for exerting thrust on said disks.

5. A spindle mounting comprising a casing, a pivotal member fixed on said casing, a sleeve mounted to oscillate about said pivotal member at one of its ends and projecting into said casing with its other end in spaced relation to the inner wall of said casing, a spindle mounted to rotate in said sleeve, a body of vibration dampening fluid in the annular space between said sleeve and said casing, annular friction disks of alternately differing diameters mounted on said sleeve in said space for displacement transversely to the axis of said sleeve, said disks being adapted to engage the inner wall of said casing in certain relative positions of said sleeve and said casing, and a spring inserted between said casing and the topmost one of said disks for exerting thrust on said disks.

6. A spindle mounting comprising a casing, a pivotal member fixed on said casing, a sleeve mounted to oscillate about said pivotal member at one of its ends and projecting into said casing with its other end in spaced relation to the inner wall of said casing, a spindle mounted to rotate in said sleeve, a body of vibration dampening fluid in the annular space between said sleeve and said casing, annular friction disks of alternately differing diameters mounted on said sleeve in said space for displacement transversely to the axis of said sleeve, alternately converging and diverging friction faces on said disks, said disks being adapted to engage the inner wall of said casing in certain relative positions of said sleeve and said casing, and means for exerting thrust on said disks.

7. A spindle mounting comprising a casing, a spherical bearing arranged co-axially with respect to said casing, a sleeve mounted to oscillate in said bearing at one of its ends and projecting into said casing with its other end, in spaced and co-axial relation to the inner wall of said casing, a spindle mounted to rotate in said sleeve, a body of vibration dampening fluid in the annular space between said sleeve and said casing, and frictional damping means mounted on said sleeve in said space for displacement transversely to the axis of said sleeve, said means being adapted to engage the inner wall of said casing when said sleeve departs from its co-axial position in said casing for a certain amount.

8. A spindle mounting comprising a casing, a resilient member fixed on said casing, a sleeve connected to said resilient member at one of its ends, so as to oscillate about said member as its pivot, said sleeve projecting into said casing with its other end in spaced relation to the inner wall of said casing, a spindle mounted to rotate in said sleeve, a body of vibration dampening fluid in the annular space between said sleeve and said casing, and frictional damping means mounted on said sleeve in said space for displacement transversely to the axis of said sleeve, said means being adapted to engage the inner wall of said casing in certain relative positions of said sleeve and said casing.

9. A spindle mounting comprising a casing, a pivotal member fixed on said casing, a sleeve mounted to oscillate about said pivotal member at one of its ends and projecting into said casing with its other end in spaced relation to the inner wall of said casing, a radial bearing in said casing at the level of said pivotal member, a spindle arranged in said sleeve and mounted to rotate in said radial bearing, a body of vibration dampening fluid in the annular space between said sleeve and said casing, and frictional damping means mounted on said sleeve in said space for displacement transversely to the axis of said sleeve, said means being adapted to engage the inner wall of said casing in certain relative positions of said sleeve and said casing.

10. A spindle mounting comprising a casing, a pivotal member fixed on said casing, a sleeve mounted to oscillate about said pivotal member at one of its ends and projecting into said casing with its other end in spaced relation to the inner wall of said casing, a radial bearing in said casing at the level of said pivotal member, a spindle arranged in said sleeve and mounted to rotate in said radial bearing, a pulley on said spindle whose tread is at the level of said radial bearing, a body of vibration dampening fluid in the annular space between said sleeve and said casing, and frictional damping means mounted on said sleeve in said space for displacement transversely to the axis of said sleeve, said means being adapted to engage the inner wall of said casing in certain relative positions of said sleeve and said casing.

WILHELM STAHLECKER.
JULIUS RAIBLE.